Nov. 8, 1966   D. C. MAREK ET AL   3,283,486
IMPLEMENT SUPPORTING AND LIFT LINKAGE
Filed May 1, 1964   3 Sheets-Sheet 1

INVENTORS
Donald C. Marek
Herbert C. Glesmann
John J. Kowal
Atty.

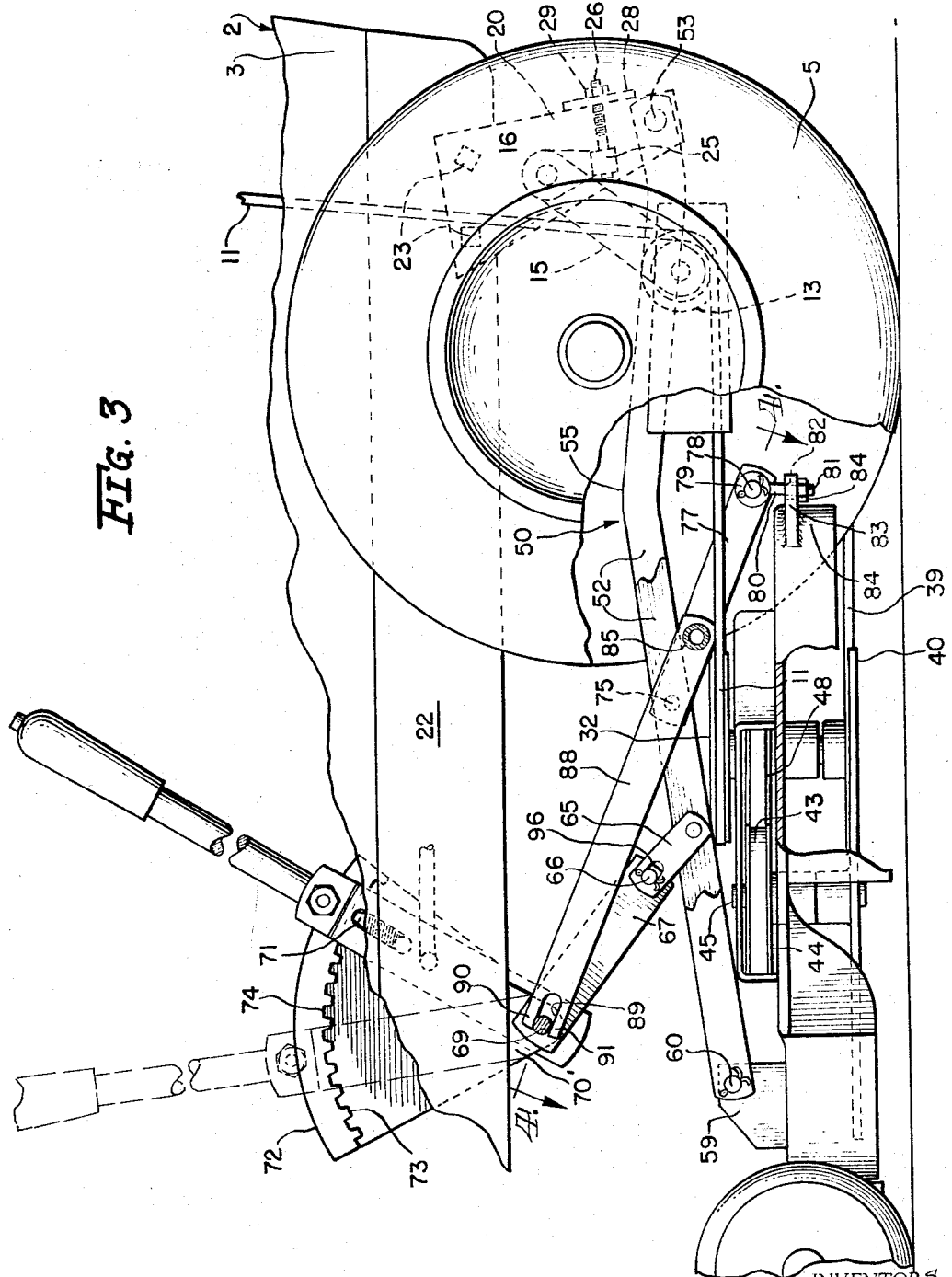

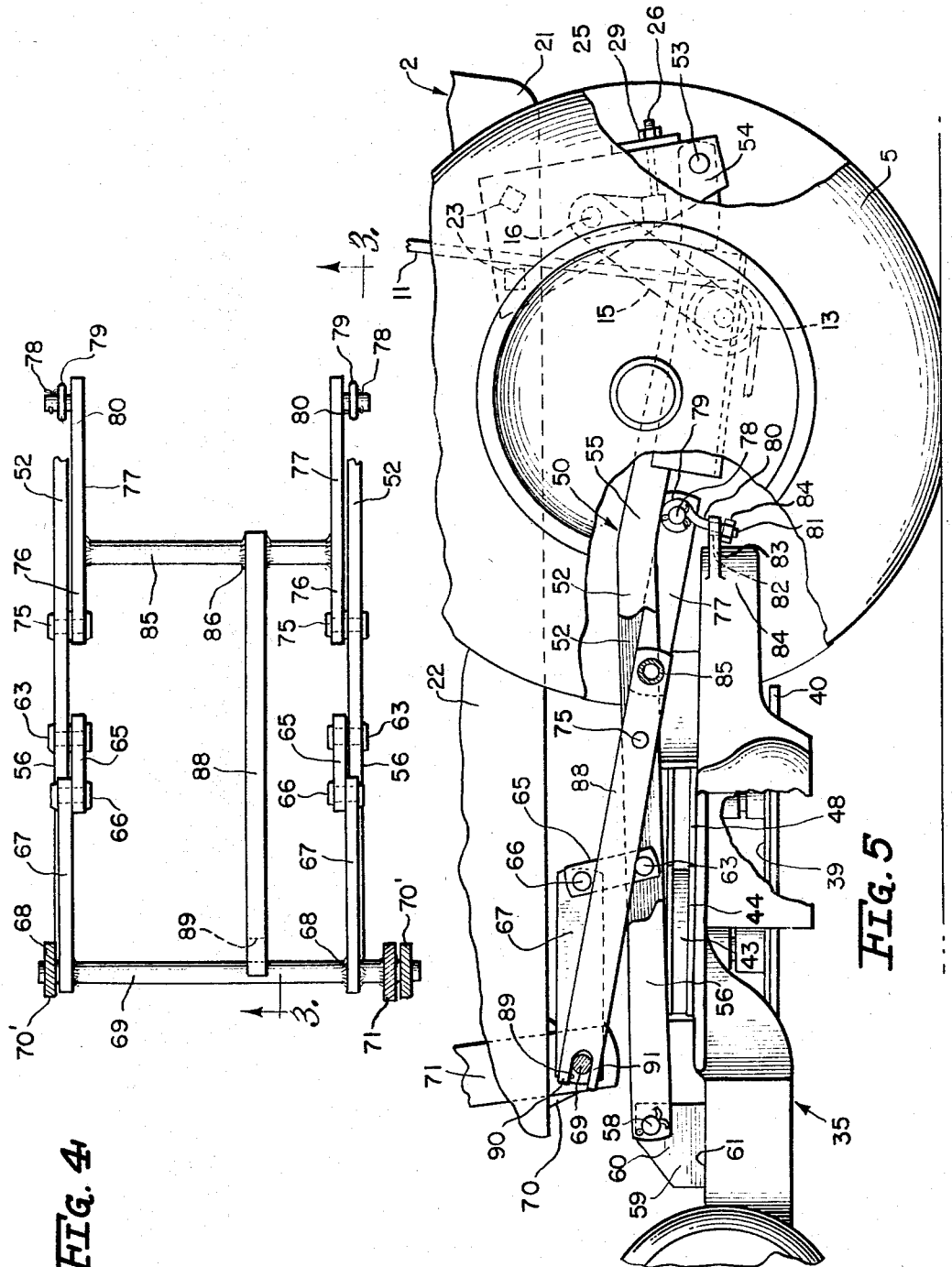

_United States Patent Office_

3,283,486
Patented Nov. 8, 1966

3,283,486
IMPLEMENT SUPPORTING AND LIFT LINKAGE
Donald C. Marek, Oak Lawn, Ill., and Herbert C. Glesmann, Papillion, Nebr., assignors to International Harvester Company, a corporation of Delaware
Filed May 1, 1964, Ser. No. 364,160
8 Claims. (Cl. 56—25.4)

This invention relates to an implement support and lifting linkage for mounting the implement from a tractor or the like.

Implements which are mounted from a tractor and are powered therefrom by a belt drive usually have the problem of maintaining adequate belt tension throughout the entire lifting range of the implement. A further problem usually arises, especially with the implements which are mounted on the so-called garden tractors, is that usually there is very little clearance under the tractor and therefore this precludes the use of an adequate linkage which not only is suitable to take the draft forces but also provide the proper geometry for lifting and lowering the implement so that it is useful in all positions thereof.

A general object of the invention is to provide a novel mounting linkage for an implement, particularly such as a mower, which provides a good lifting range and at the same time permits the mower to float.

A further object of the invention is to provide a novel linkage for a mower implement or the like in which the implement is moved vertically through an operating range without materially affecting the belt tension.

A still further object of the invention is to provide a novel linkage for mounting a mower beneath a tractor, such linkage having a pivotal connection with the tractor at a point substantially distant from the mower itself so that as the mower is raised and lowered it swings through a relatively short portion of a large arc.

A still further object of the invention is to provide a novel, simple and efficient linkage wherein the virtual hitch point of the implement is located substantially at the front end of the tractor.

A still further object of the invention is to provide a novel, efficient and effective linkage which obtains a substantially scissor-like action of the links to simultaneously lift the front and rear ends of the mower at substantially the same rate.

A more specific object of the invention is to provide a novel linkage which incorporates a pair of laterally-spaced draft members which extend lengthwise of the tractor and have their forward ends pivoted to the tractor on a substantially transverse axis, the rear ends of the draft members being pivoted to the rear end portion of the mower and the front end of the mower being connected to lifting links which are pivotally connected to the draft members intermediate their ends and the lifting links being connected to a compensating link which has a reactive connection to the tractor such that as the draft links are elevated the compensating link swings the lifting links about the pivotal connections of the lifting links with the draft members whereby, substantially affecting the rate of ascent and descent of the front end of the mower, commensurate with the similar movements of the rear end of the mower.

These and other objects and advantages of the invention will become more readily apparent from the specification and the drawings wherein:

FIGURE 3 is a fragmentary enlarged side elevational view of the structure in lowered position and partly in vertical section taken substantially on the line 3—3 of FIGURE 4;

FIGURE 4 is a view taken substantially on the line 4—4 of FIGURE 3; and

FIGURE 5 is a side elevational view similar to FIGURE 3 showing the parts in elevated position.

Figure 1:
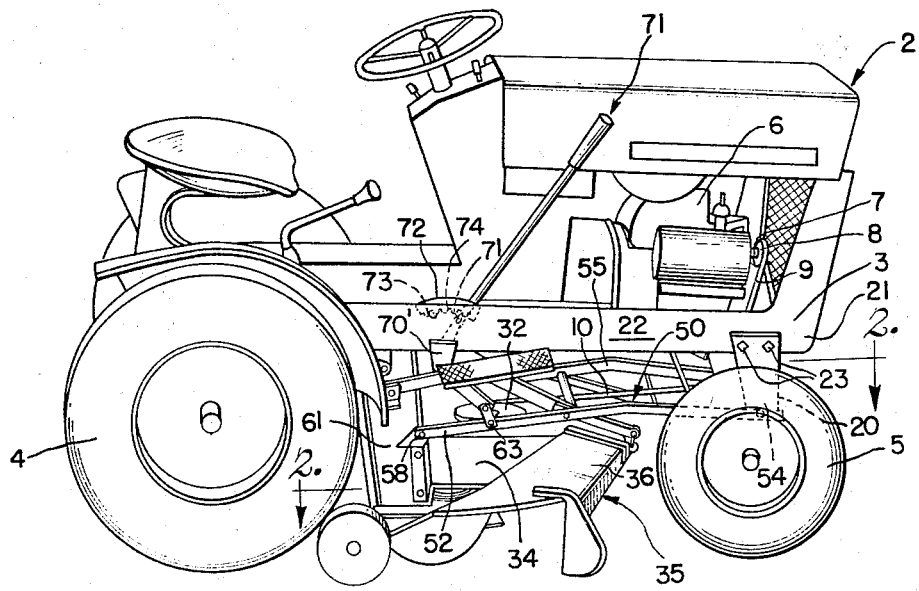
FIGURE 1 is a side perspective view of the mower and mounting therefor from an associated tractor.
Figure 2:
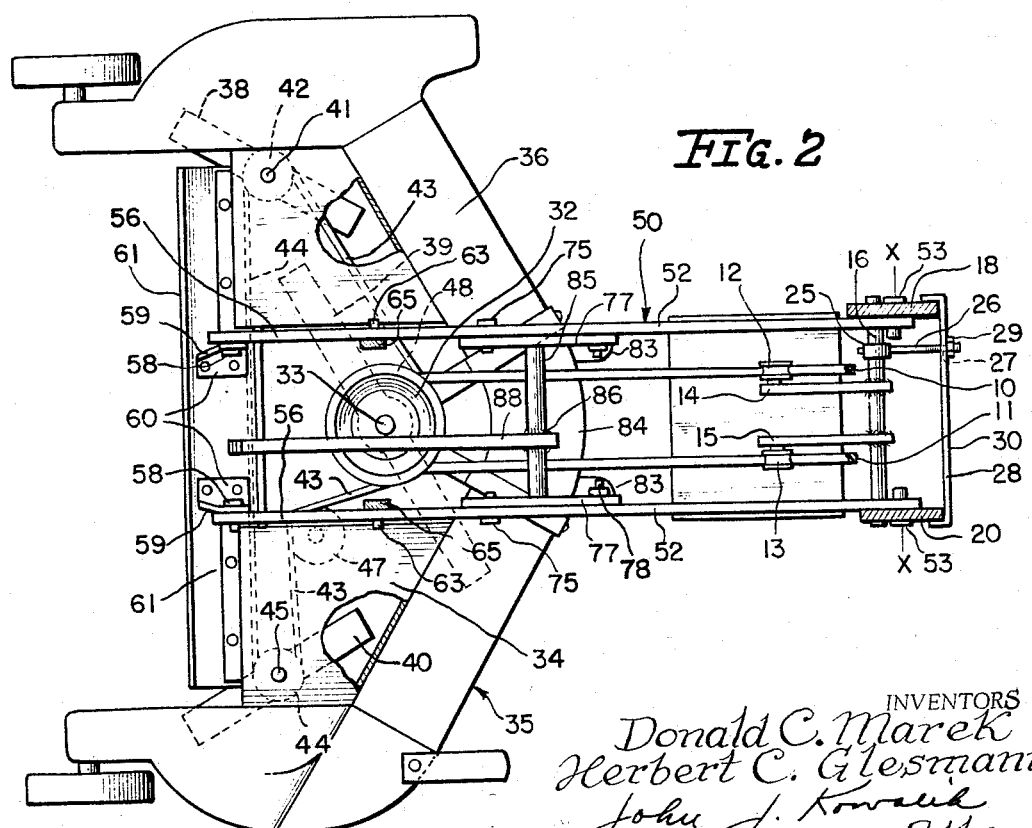
FIGURE 2 is an enlarged plan view of the mower and mounting linkage in section taken substantially on the line 2—2 of FIGURE 1.

Referring to the drawings, there is shown a tractor generally designated 2 which comprises a longitudinal body 3, rear traction wheels 4 and front supporting and steering wheels 5. The tractor engine 6, mounted in body 3, provides a forward output shaft 7 with a pulley 8 about which is trained the driving belt 9, said belt having advance and return runs 10 and 11, the advance run 10 being passed under a tightener and guide pulley 12 and the return run 11 being disposed under a similar pulley 13. The pulleys 12 and 13 are carried respectively on arms 14, 15 which are supported on a shaft 16, said shaft 16 being pivotally mounted on and between a pair of anchor plates 18 and 20 which at their upper ends straddle the lower front end portion 21 of the body 3 of the tractor and are connected to the side sills 22 thereof as by bolts 23. The shaft 16 is connected to an adjusting arm 25 which is connected to a bolt 26, said bolt 26 being passed through an aperture 27 in a spanner plate 28 which interconnects the anchor members 18 and 20. The outer end of the bolt 26 is threaded and there is provided a nut 29 which reacts against the forward side 30 of the brace 28 and thereby effects adjustment of the pulleys 12 and 13 in order to attain the proper tension of the belt. It will be observed that the drive arrangement to the belt is in the nature commonly referred to in the art as a mule drive and that the belt proceeds with its advance run 10 rearwardly beneath the tractor body and is wrapped around the back side of a pulley 32 which is connected to a vertical spindle 33 suitably journalled from the top of the housing 34 of the mower generally designated 35. The return run of the belt extends generally parallel to the advance run in a substantially horizontal plane and proceeds forwardly from the pulley 32 beneath the idler 13 and back to the driving pulley 8.

The mower generally designated 35 is somewhat V-shaped in plan and comprises the aforementioned housing 34 which has a forward portion providing a tunnel structure 36 within which the grass or vegetation clippings are adapted to be channelled, that is from the leftward mower blade 38 to the center mower blade 39 and thereby to the rightward mower blade 40. It will be seen that the blades 38, 39 and 40 are arranged in a somewhat triangular pattern and that the blade 38 is carried by vertical shaft 41 which is suitably journalled from the top of the housing, the shaft 41 being connected to a pulley 42 which is driven by a belt 43, said belt 43 having its rear run 44 extending from the pulley 42 to the pulley 44 which is connected to the vertical spindle 45, the spindle 45 being suitably journalled from the housing 34 and being connected to the mower blade 40. The forward run 46 of the belt 43 extends from the forward side of the pulley 44 around the back side of an adjustable idler pulley 47 mounted on housing 34 and then proceeds around the forward side of pulley 48 which is connected to the shaft 33 which drives the center rotor 39. The forward run of the belt 43 then proceeds to and around the forward and outer side of the pulley 42 whence it continues as the rear run 44 of the belt. Thus it will be seen that the drive from the belt is in a substantially horizontal plane to the middle pulley 32 which is mounted on a substantially vertical axis.

The mower is suspended from the tractor by a novel support linkage generally designated 50 which comprises a pair of laterally displaced substantially horizontally extending combination lift and draft arms 52, 52 which at their forward ends are pivoted as at 53 to the lower ends 54 of the anchor elements 18 and 20. The draft arms are bowed upwardly intermediate their ends at at 55 in order to clear the deck of the mower over which the rear end portions 56 of the arms 52 extend. The rear ends of the arms 52 are pivoted on pins 58, on a substantially horizontal axis generally parallel to the axis of the pivotal mountings at 53, to the upright ears 59 of the bracket member 60 which are secured to the rear deck portion 61 of the mower. Thus, the rear end portion 61 of the mower is swingable upwardly and downwardly about the pivot axis indicated X—X as represented by the pins 53, and a long pivot arm is provided to the mower so that the mower swings in an extremely shallow vertical arc whereby the position or locus of the spindle 33 at its uppermost and lowermost positions is substantially the same and its movement fore and aft is extremely minimal and within the stretch limit of the belt so that proper tension is maintained in the drive belt in all positions of the mower.

The draft arms are pivotally connected on a substantially horizontal axis by means of pins 63, 63 at their rear portions 56 to the lower ends of lifting links 65, 65, said links 65 having their upper ends pivotally connected on a substantially horizontal axis as by pins 66, 66 to the forward ends of lift arms 67, 67 which at their rear ends are connected as at 68, 68 to a pivot or rockshaft 69 which is mounted on brackets 70 suitably connected to the side sills 22 of the tractor. The shaft 69 is connected to an upstanding lever 70 which incorporates a spring-loaded latch 71 operating within a quadrant 72 which is carried from the side sill of the tractor, said quadrant 72 having a toothed sector 73 which selectively receives the latch lug 71 into any of the notches 74 for holding the linkage against movement as the mower is set in certain selected positions.

The main lift arms or drag links 52, 52 are connected at the forward ends of the rear portions 56 by means of pins 75, 75 to the upper rear ends 76, 76 of the forward lift links 77, 77 said lift links 77 being provided with pivot pins 78 at their forward lower ends and provide pivotal connections for the upper eye ends 79 of the eyebolts 80 which have their lower bolt ends 81 extending through enlarged apertures 82 in forwardly projecting ears 83 which are integral and extend forwardly from the front apex piece 84 of the mower housing. The lower ends of the bolts 81 are provided with self-locking nuts 84 which are underposed with respect to the respective ears 83 and which with the loose openings 82 serve as universal connections to the forward ends of the forward lifting links 77. The lifting links 77 are rigidly interconnected intermediate their ends by a torsion bar 85 which is fixedly connected, as by welding as at 86, intermediate the links 77 to the forward lower end of a compensating bar or arm 88, said compensating bar having a longitudinal slot 89 in the rear end thereof defined by upper and lower furcations 90, 91 which embrace the pivot or rockshaft 69. Thus, the rear end of the compensating link has a sliding pivotal or lost-motion pivotal connection on an axis which is fixed with respect to the tractor. The geometry of the compensating linkage and the points of connections of the forward links 77 with respect to the points of connection 60 of the main lifting arm 62 to the rear portion of the tractor by means of the brackets 59 is so chosen that the forward end of the mower lifts at substantially the same rate as the rear end and moves in a minimal arc about the forward axis of pivot 53 of the main lifting arms.

Thus, the mower moves substantially vertically and disposes the blades generally horizontally in all positions of the mower without excessively swinging the mower so as to loosen or excessively tighten the belt in different positions of the mower.

The mower rear portion 61 is provided at opposite ends of the mower with rearwardly extended gauge wheels 95, 95 which serve to support the rear end of the mower when upon the ground and it will be seen that the links 65 have elongated slots 96 which permits the mower to float with the arms 52 pivoting about axis 53. The float of the forward end of the mower has been previously explained and additional float obtains through pivot of the compensating linkage.

An efficient lifting system is provided such that the load is applied to the rear end of the mower, thereby the mower is adapted to drive with its front end over obstructions since it has limited vertical movement with respect to the supports at the foward end of the mower, namely, the bolts 81.

What is claimed is:

1. In a support for a mower beneath a tractor having a longitudinal body, draft link means pivotally supported from said body on a substantially horizontal axis for vertical swinging movement adjacent the front end of said body and extending rearwardly therefrom, a mower beneath the body, means pivotally connecting the rear end of the mower from said draft link means, link means supporting the front end of the mower from said draft link means intermediate the ends thereof, means on the tractor disposed in lifting relation to said draft link means for swinging said draft link means and thereby the mower substantially vertically, and means for moving said link means connecting the front end of the mower with the draft link means substantially commensurate with the movement of the rear ends of said draft link means whereby said mower is maintained substantially horizontally in all positions thereof.

2. In the mounting of a mower from beneath a tractor, the combination of a pair of draft links having forward ends pivoted from the tractor and having rear ends extending rearwardly from the point of pivot with the tractor, a mower having a rear end portion pivoted to the rear ends of said draft links and extending forwardly therefrom and having a forward portion beneath said draft links in an area intermediate the ends thereof, lifting link means operatively connected to the front end portion of said mower and extending rearwardly therefrom and pivotally connected to said draft links intermediate the ends thereof, compensating link means fixed to said lifting link means, and means for lifting said draft links connected thereto, said compensating link means having a reaction point on said tractor providing a rotatable sliding connection for said compensating link means, whereby said compensating link means is swingable vertically and movable fore and aft with respect to said tractor.

3. In a mower mounting, an ambulatory support, draft link means pivotally connected at one end of said support and extending rearwardly from their points of connection therewith, an implement having a rear portion pivotally connected to said draft link means on an axis generally parallel to the axis of pivot of said link means in an area rearwardly of said axis of pivot of the link means to the support, forward link means pivotally connected to said draft link means intermediate the connections of said link means with said support and said implement and pivotally connected to said implement in an area forwardly of the connection of said implement with said draft link means, said forward link means having a slidable pivotal connection with said support structure, and means for raising and lowering said implement with respect to said support connected to said draft link means.

4. In a mower mounting for a tractor having a substantially longitudinal body, anchor means depending from said body and having a lower end portion, draft link means having a forward end portion pivotally connected to said lower end portion of the anchor means and extending rearwardly beneath the body and terminating in rear end portions, a mower having a rear portion pivotally connected to said rear end portions of said draft link means, and extending forwardly therefrom and terminating in a front portion, link means connected to said front portion of the mower and pivoted to said draft link means intermediate the ends thereof, said tractor having an engine including a front end output shaft, a pulley on said output shaft, pulley means carried from the tractor body below said pulley, said mower having a vertical drive input shaft with pulley means thereon rotatable in a substantially horizontal plane, a belt drive between the pulley on the output shaft of the engine and the pulley means of the mower arranged in a mule drive, said belt having a run extending from said pulley under said pulley means and wrapped about the rear side of said pulley means and having a return run extending from said pulley means on the mower under the pulley means on the tractor to the pulley on the engine output shaft, and means for maintaining the mower in a position holding the belt tight in substantially all vertical displaced positions and comprising a compensating link extending between and connected to said front link means and having a lost-motion pivotal connection with the tractor at a point rearwardly from the points of connection of the front link with the draft link means and with the mower.

5. In a mower mounting from a tractor having a body and engine and a pulley rotatable on a substantially horizontal axis and providing a power output at the front end of the tractor at an elevation above the mower, a pair of draft links having forward ends pivoted on a generally horizontal axis from the forward end of the tractor below said pulley and extending rearwardly to a position in front of the rear wheels of the tractor, a mower beneath the body of the tractor and having a rear portion adjacent to said rear wheels and a front portion adjacent to the front wheels of the tractor, means coaxially pivotally connecting the rear ends of said draft links to the rear portion of the mower on a substantially horizontal axis, a lifting lever pivoted to the body for swinging movement about a generally horizontal axis at a level above the axis of connection of the rear ends of the draft links to the mower, lifting arm means connecting the lifting lever with the draft links for vertical swinging movement about the axis of pivot of the forward end of the draft links, and a linkage pivotally connected to the draft links intermediate their ends and having a lower end universally connected to the front portion of the mower and having an extension slidably and pivotally supported from the tractor on an axis of pivot displaced fore and aft of the tractor with respect to the connection of the linkage to the front end of the mower.

6. The invention according to claim 5 and said pivotal support of the extension being coaxial with the pivot of the lifting lever.

7. In a mounting for a mower from the waist of a tractor, a pair of laterally spaced draft links having front and rear ends and pivoted at their front ends to the tractor on a generally horizontal axis and extending rearwardly therefrom, a mower beneath said draft links having a rear portion pivotally connected to the rear ends of the draft links on a generally horizontal axis, lift control links pivotally connected to said draft links intermediate their ends on a generally horizontal axis and projecting forwardly therefrom and terminating in front ends at the front portion of the mower, means serving as universal connections between the front ends of said control links and the front portions of the mower, a control arm having a lower end connected with said control links and having an upper end disposed rearwardly of the pivotal connections of the control links with the draft links, means providing a connection for the upper end of the arm with the tractor on a generally horizontal axis, said arm having a slot elongated lengthwise of the arm admitting said last-mentioned means therein, and means for lifting the mower.

8. In a mower mounting from an ambulatory structure, the combination of a mower underposed with respect to said structure, draft link means pivoted to the structure and to the mower on generally parallel substantially horizontal axes, said mower projecting forwardly from its connection to the link means, lifting link means connected with the mower at an area forwardly of the connection of the draft link means with the mower, means swingably connecting the lifting link means with the draft link means, means slidably and pivotally connecting said lift link means with the structure on a generally horizontal axis, and means for lifting the draft link means carried from the structure and having a lost-motion connection with the draft link means.

No references cited.

ABRAHAM G. STONE, *Primary Examiner.*

ANTONIO F. GUIDA, *Examiner.*